Nov. 28, 1950 — W. DUBILIER — 2,532,016
ELECTRICAL LIQUID TREATING DEVICE
Filed June 5, 1945 — 2 Sheets-Sheet 2
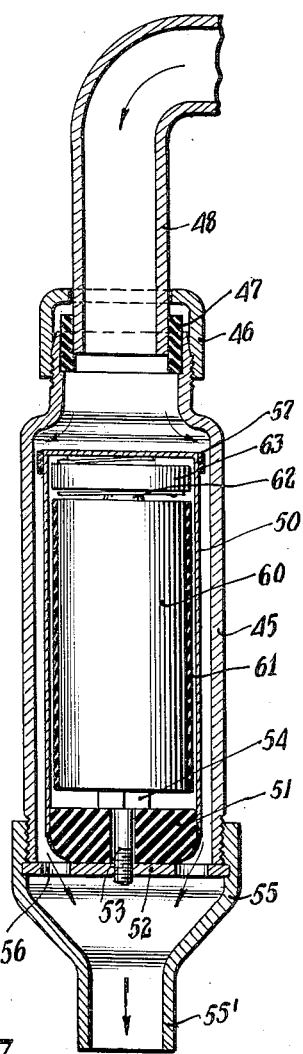
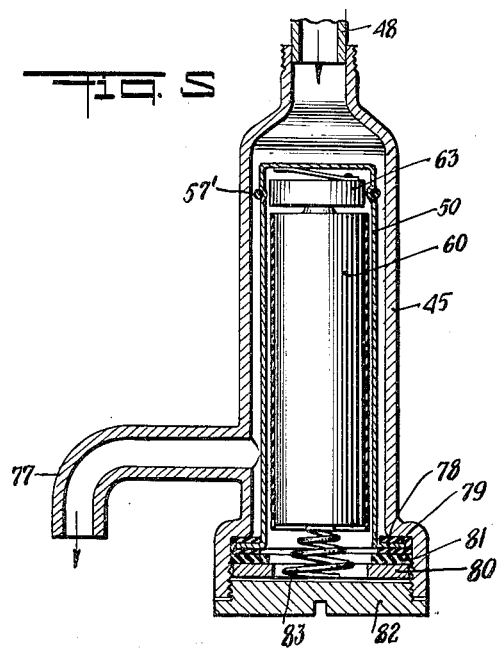
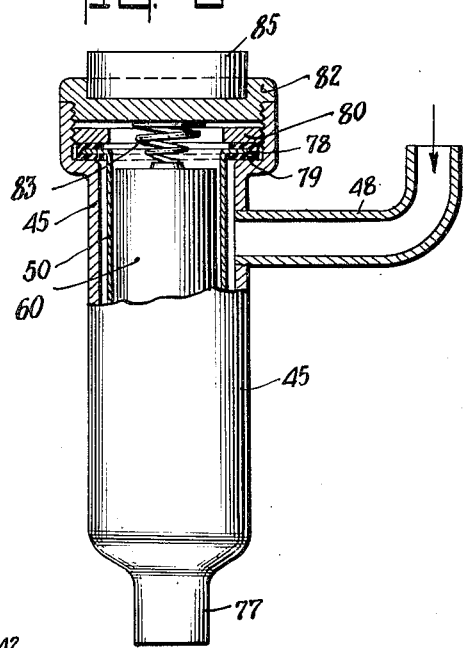
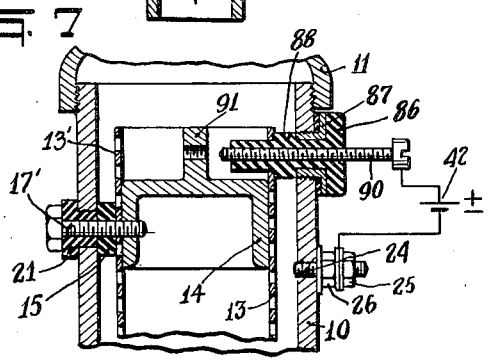
INVENTOR.
William Dubilier
BY
ATTORNEY Patented Nov. 28, 1950

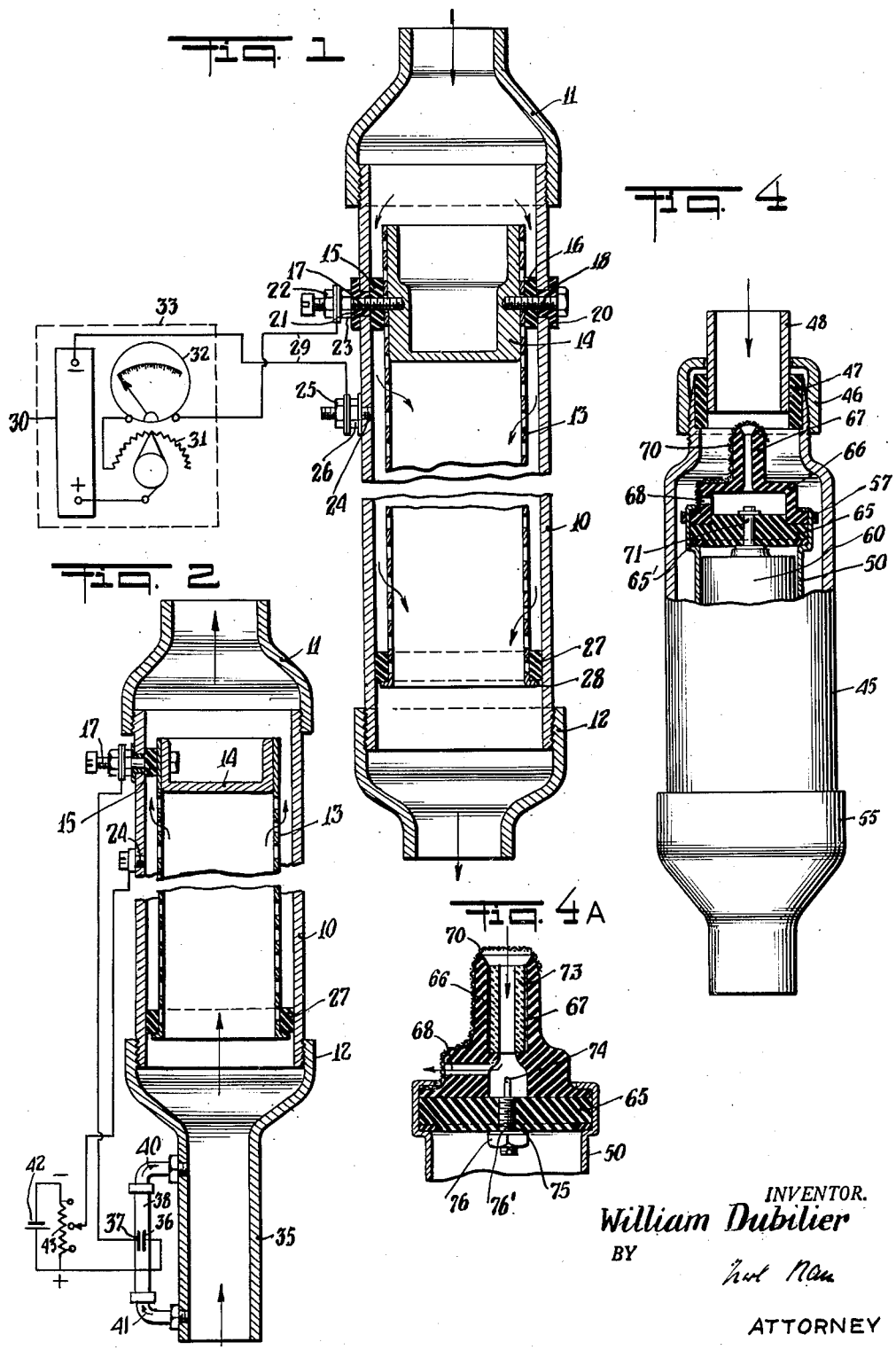

2,532,016

UNITED STATES PATENT OFFICE 2,532,016

ELECTRICAL LIQUID TREATING DEVICE

William Dubilier, New Rochelle, N. Y.

Application June 5, 1945, Serial No. 597,695

6 Claims. (Cl. 204—305)

The present invention relates to devices for the treatment of water to reduce or eliminate the effects of hardness thereof, such as for the prevention of scale in boilers, pipelines, etc., and to prevent other defects due to the presence of mineral matter and other impurities in the ordinary water supply.

More particularly, the invention is concerned with treating devices of this character wherein the water is passed on its way to the consumer between a pair of electrodes maintained at a predetermined potential difference low enough to avoid corrosion effects or electrodeposition by electrolysis or other chemical action.

According to known arrangements of this type such as described, for instance, in U. S. Patent No. 2,207,583, the water is conveyed on its way to the consuming means, substantially without chemical change, over a first electrode (anode) connected to the positive pole of a unidirectional current source of a voltage of the order below about 12 millivolts, said source having its negative pole connected to a cooperating electrode (cathode) also exposed in contact with the water.

The actual phenomena taking place and function underlying this method of conditioning or treating water are not yet fully understood. It appears, however, that the action taking place is of an essentially physical rather than chemical nature on account of the low treating voltage or current densities used, precluding electrolysis or other chemical action.

According to one possible explanation, the ions of the salts or other impurities present or dissolved in the water, in coming in contact with or in close proximity to the electrodes, are charged at least in part so as to become neutral particles, whereby to prevent their later precipitation in the form of a regular or crystalline scale structure, so as to result, in the case of a boiler or heating device, in an amorphous or mud-like deposit which can be easily removed. A similar effect may be caused by the electric current itself passing through the water from one electrode to the other, which explains the possibility of using both alternating current (A. C.) and direct current (D. C.) voltage, though the latter has been found to produce better and more consistent results in practice. In any case, it is evident that the treating voltage should be sufficiently low to prevent movement or attraction of the salt ions or particles towards the electrodes to avoid decomposition or deterioration of the electrode material and other undesirable chemical effects.

This neutralization or charging of the ion particles present in so-called hard water has been found to produce other desirable effects in connection with various uses of water thus treated, in particular in reducing the amount of soap required to produce a good lather and in preventing the formation of a curd or smudge resulting in the well-known bathtub rings and other undesirable effects directly due to the hardness of the water being used.

Among the objects of the present invention is the provision of a water-treating device of the above character to reduce or prevent the effects of hardness which is both simple in design and easy and efficient in use; which is inexpensive to manufacture; which can be easily and quickly installed; which may be used in connection with any type of water or degree of hardness thereof; and which is inexpensive in use and reliable in operation throughout its life.

In water-treating apparatus of the above type, it is customary to use a separate battery or small rectifier unit supplied from an A. C. power supply for providing the necessary treating potential through a series resistance adjusted to result in the required critical potential difference between the electrodes of the device. By the proper adjustment of the series resistance with the aid of a microammeter indicating a given current for a particular size of apparatus and type of water to be treated, the correct treating potential difference between the electrodes may be obtained and readjusted from time to time to maintain the optimum efficiency of the device.

Since, however, the quality or hardness of the water differs in different locations, and even varies from time to time at the same location, a constant supervision and readjustment is required to insure full operating efficiency at all times.

A further object of the invention is, therefore, to provide an improved treating apparatus of the above-mentioned character which may be prefabricated in such a manner as to result in a proper treating voltage substantially independently of the location or characteristics of the water being treated and substantially without requiring any special adjustments and supervision during use.

Another object of the invention is to provide a water-treating device of this character of simplified design and suitable for use in the home by enabling its easy and quick attachment to an ordinary water faucet for various purposes such as to improve the solubility of soaps and to reduce or eliminate other defects due to the hardness in existing water supplies.

Other objects and novel aspects of the invention will in part be pointed out and in part become apparent as the following detailed description proceeds, taken in reference to the accompanying drawings forming part of this specification, and wherein:

Figure 1 is a cross-sectional view through a water-treating device embodying the principles of the invention and designed for manual adjustment and control of the treating voltage;

Figure 2 shows a modified and improved device of this type wherein different characteristics of the water to be treated are automatically taken into account, substantially without adjustment and supervision;

Figure 3 is a cross-section through a simplified treating unit of small size suitable for direct attachment to a household water faucet;

Figure 4 shows a modification of a unit according to Figure 3, embodying means for automatically compensating for different degrees of hardness and/or other characteristics of the water to be treated;

Figure 4A is a fractional view of Figure 4 showing a further modification of the invention;

Figures 5 and 6 are cross-sections of further simplified small-size treating units constructed in accordance with the invention; and Figure 7 is a fractional view showing still another modification of an automatically compensated treating device constructed in accordance with the principles of the invention.

Like reference numerals identify like parts throughout the different views of the drawings.

Referring more particularly to Figure 1, the reference numeral 10 represents a hollow cylindrical housing or tubular electrode advantageously serving as the cathode of the device and which may be directly inserted in a supply water conduit by means of suitable joints or connecting members 11 and 12, all of which may be of standard design, to pass water from a supply source to a consumer, as indicated by the arrows in the drawing.

Mounted concentrically within the electrode 10 is a further hollow cylindrical and suitably apertured or perforated inner electrode or anode 13 electrically isolated from the electrode 10 and arranged in such a manner that the water will pass through the device exposed in contact with both electrodes, and that as much as possible of the water will come in contact with the electrodes for the reason which will become obvious from the following.

In the construction shown, the electrode 13 which may be formed from perforated sheet metal bent and riveted or otherwise connected together at the overlapping edges, is mounted by the provision of a cup-shaped supporting or reinforcing member 14 snugly fitting within its upper end and rigidly connected thereto by riveting or in any other suitable manner. The electrode 13 is held in spaced relation from the outer electrode by a pair of diametrically disposed spacing members or insulating washers 15 and 16 and connected or secured to the outer electrode or tube 10 by means of bolts 17 and 18. The latter are insulated from the electrode 10 by means of insulating washers 20 and 21, each having a depending sleeve portion surrounding the bolts 17 and 18 and fitting within suitable bores in the outer tube. Bolt 17 is suitably provided with a pair of terminal nuts 22 and 23 for securing a connecting wire or lead leading to a battery or the like in the manner shown and described in detail hereafter.

A cooperating terminal post for the outer electrode 10 is provided in a similar manner consisting of a threaded stud 24 engaging a tapped hole of electrode 10 and cooperating clamping nuts 25 and 26 for securing a further wire or lead connected to the opposite pole of the battery or other voltage-supply source.

The lower end of the inner electrode 13 is spaced and insulated from the outer electrode by the provision of a further ring-shaped insulating spacer 27 held in place by crimping or spinning over the edge of the electrode 13 in the manner shown at 28 in the drawing.

Suitable operating potential difference is applied to the electrodes 10 (cathode) and 13 (anode) from a dry cell 30 or other source of supply voltage connected by suitable leads or wires to the electrode terminal posts, as shown, in series with an adjustable resistor 31 of the wire-wound or any other suitable type, and a microammeter-type indicator 32. The battery 30, resistor 31, and meter 32 are advantageously mounted in a separate casing or control box indicated by dotted lines 33.

By varying the resistor 31 to a point where the meter 32 indicates a predetermined current for a given size of apparatus and type of water to be treated, the treating voltage between the anode 13 and the cathode 10 may be adjusted to a desired critical value to insure efficient operation and optimum effects of the device. Experience has shown that treating voltages of less than about 12 millivolts will produce satisfactory results. If desired, of course, other means for adjusting the operating voltage may be employed such as a millivoltmeter directly connected to the electrodes 10 and 13.

Although most satisfactory results have been obtained by using the outer electrode as the cathode which may be suitably grounded through the water or pipe line, a reversal of the polarity is possible, in which case the outer electrode will be the anode and the inner electrode functions as the cathode. In the first case, as shown in the drawing, the outer electrode may consist of iron, while the inner electrode is preferably of brass, or both electrodes may advantageously consist of brass or an equivalent metal to prevent corrosion and other undesirable chemical effects in connection with the foreign matter or impurities present in the water being treated.

If the inner electrode is used as the anode, satisfactory results have been obtained in reducing or eliminating the effects of hardness of water and in order to insure optimum results, the device is advantageously so constructed as to cause a maximum of the water being treated to come in contact or close proximity with the electrodes. This may be accomplished by the use of as close a spacing distance as possible between the electrodes (about ⅛ to ¼" or more, depending upon the size of the apparatus) and by the employment of perforated electrodes such as shown in the drawing. An alternative means for increasing the exposed electrode surface, especially that of the anode in Figure 1, consists in providing the latter with longitudinal grooves or flutes and/or by suitably roughening or etching the surface of the electrodes by sandblasting, chemical etching, or in any other suitable manner.

Referring to Figure 2, there is shown a device similar to that of Figure 1 and embodying means, whereby a special adjustment for different types or characteristics of the water being treated is not required, resulting both in great simplification of the apparatus and ease of installment, as well as a complete elimination of supervision during use.

There is provided for this purpose a special series resistance unit for dropping the voltage of the battery or other supply source to the desired treating or operating voltage between the main electrodes 10 and 13, the resistance of said unit varying in the same manner as the resistance of the water being treated, whereby to result in a constant resistance ratio or division of the battery voltage upon the voltage drops across the series resistance and the drop across the treating electrodes of the device, respectively. As shown diagrammatically in the drawing, the auxiliary or series resistance is connected to the tube or conduit 35 of the device and comprises a column or volume of water passing between or being enclosed by a pair of electrodes 36 and 37 suitably mounted within an insulating tube 38 of glass or other material connected to the pipe 35 through inlet and outlet members in the form of bent or angular metal tubes 40 and 41 or the like, respectively, in such a manner as to cause a portion of the water through the conduit 35 to flow through the thus-provided by-pass and in contact with the electrodes 36 and 37, as indicated by the arrows in the drawing As a result of the main liquid gap formed by the electrodes 10 and 13 being included in the conduit extending from the opposite ends thereof, the entire liquid stream to be treated will be restricted to the main liquid gap in exposed contact with the electrodes 10 and 13, the auxiliary liquid gap formed by the electrodes 36, 37 being spaced and substantially electrically independent from said main liquid gap.

In the example shown, the electrode 36 is connected to the positive pole of the battery or dry cell 42 through a suitable electrical conductor or wire and the electrode 37 is connected in series with the gap between the main treating or operating electrodes 13 and 10 of the device to the negative pole of the battery, or a suitable tap point of an adjustable potentiometer resistance 43 shunted across the battery terminals, as shown in the drawing. Accordingly, the auxiliary liquid gap formed by the electrodes 36 and 37 is electrically connected in series with both the main liquid gap formed by the electrodes 10 and 13 and the voltage source 42, 43, in the manner of an electric voltage divider or potentiometer circuit.

Accordingly, therefore, since the specific resistance of the water gap between the auxiliary electrodes 36 and 37 varies in the same manner as the specific resistance of the main liquid gap between the electrodes 10 and 13, it is seen that the division of the battery voltage upon the auxiliary resistance between electrodes 36 and 37 and the main resistance between electrodes 10 and 13 will remain constant, depending merely on the geometric design, that is, the relative space or volume enclosed by the electrodes 10 and 13, on the one hand, and by the electrodes 36 and 37, on the other hand.

Thus, assuming, for instance, a battery or other supply voltage of 1.5 v., such as supplied by a standard dry cell, and a desired operating voltage of 1.5 mv. for the treatment to be maintained between the main operating electrodes 10 and 13, all that will be necessary to insure the proper operating voltage is to design the ratio between spacing and area of the electrodes 36 and 37 of the series water resistance unit to be equal to $$\frac{1.5}{0.0015} = 1000$$

times the ratio between the spacing and area of the electrodes 10 and 13. The desired operating voltage of 1.5 mv. will then be applied at all times and under all operating conditions to the electrodes 10 and 13 of the treating unit without any further controls or adjustments and independently of the hardness or other characteristics and changes of the particular water being treated, as will be readily understood from the above.

If, for one reason or other, it is desired to vary the operating voltage with a given design of apparatus, such as from 1.5 mv. to, say, 3 mv., a corresponding initial voltage may be derived from a suitable tap of the potentiometer 43. Alternatively, the device may be designed for any other operating voltage to be provided by a standard battery or dry cell by the proper relative construction and design of the series resistance unit in a manner which will be evident from the above.

In the design of a device afore-described and shown in Figure 2, care should be taken that the shunt or parallel resistance path from the electrode 36 directly to the outer electrode or cathode 10 through the tubes 40, 41 and 35 has a value which is large compared with the resistance of the water column between the electrodes 36 and 37.

In the example shown, the resistance of the water column enclosed by the electrodes 36 and 37 is shown to be a small fraction of the resistance between each of said electrodes and either of the connecting tubes 40 and 41, whereby to cause the major portion of the current to pass between the electrodes 36 and 37 to the main electrodes 13 and 10 and back to the negative terminal of the battery and to render the by-pass or shunt current returning directly to the battery through members 40 or 41, 35 and 10, of negligible value. Furthermore, by making tubes 40 and 41 of insulating material, the relative resistance of the direct return or shunt path to the cathode may be further increased.

Referring to Figure 3, there is shown a modified construction of a device according to the invention, being of simple and compact design and suitable for direct attachment to a water faucet or the like and embodying a dry cell of standard design and a series resistance structurally embodied therein. The numeral 45 represents an outer tubular casing forming the cathode of the device and having an upper conically-shaped end of lesser diameter designed to cooperate with a screw-on type cap 46 and resilient gasket 47 to enable its quick connection to a faucet or other water supply pipe or tube 48.

The inner electrode or anode 50 has the form of a metal cup concentrically mounted within the cathode 45. For this purpose, the lower open end of the cup 50 is closed in a liquid-tight manner by a plug or stopper 51 preferably consisting of rubber or an equivalent material and forced into or otherwise mounted in the cup 50. The outer surface of the plug 51 has secured to it a metal disk 52 such as by means of a bolt 53 having a nut 54 engaging the inner surface of the plug, said bolt being threaded into a center bore of the disk 52.

The entire sub-assembly comprising the anode cup 50, resilient plug 51, and disk 52 is at first mounted within the internally threaded conically-shaped cap 55 terminating in a tube or outlet 55' by screwing the peripherally threaded disk 52 into the cap 55, whereupon the latter is, in turn, screwed onto the lower end of the cathode casing 45, as shown in the drawing. Disk 52 is provided with suitable apertures or perforations 56 to enable the passage of water from the inlet pipe 48 in between the electrodes 45 and 50 and out through the outlet 55', as indicated by the arrows in the drawing.

In order to prevent accidental short-circuits between the electrodes 45 and 50, an insulating spacer ring 57 of rubber or the like, or any equivalent spacing means, such as a coating of varnish, is shown mounted at or near the upper closed end of the cup 50, such as by a crimping connection or in any other suitable manner.

The space inside the cup or anode 50 closed in water-tight manner by the plug 51 is suitably utilized to accommodate a dry cell 60 of the known flashlight or similar type available on the market and surrounded by an insulating tube 61. The lower or negative pole of the cell 60 formed in a known manner by its metallic casing, is in direct contact connection with the nut 54 and accordingly also with the cathode through the continuous conducting path formed by the bolt 53 and metallic disk 52. The positive pole or central terminal of the dry cell 60 engages a resilient contact or terminal of a resistance element 63 embedded in a suitable wafer-shaped insulating casing and having a cooperating terminal also in the form of a resilient contact and engaging the inner end or bottom of the cup 50 forming the anode of the device, in a manner well understood from the above. In order to insure a good electrical connection of the cathode 45 to ground by way of the inlet pipe 48, gasket 47 may consist of electrically conducting rubber or an equivalent material or it may be in the form of a slit metal ring or equivalent conducting element.

There is thus provided by the invention a treating unit of the type described which is both compact and simple in construction, which may be easily and readily connected to an existing water supply such as an ordinary water faucet and which may be quickly and readily disassembled and reassembled for exchange of the battery or dry cell, or to replace the series resistance to conform with any existing conditions or requirements. For practical purposes, a set of resistors 63 of standard ranges may be provided, designed for the most common types of water or ranges of hardness to be expected, and the proper resistance unit dropped in the cup 50 before insertion of the dry cell during assembly of the device.

In order to insure efficient contact to the battery terminals, an additional resilient spacer or contact element in the form of a coil spring, etc., may be provided and inserted between the nut 54 and the cathode or metal casing of the dry cell 60. Moreover, resistor 63 may be adjustable in any suitable manner to avoid the necessity of a large number of units if widely varying operating conditions and characterizations of the water being treated are anticipated.

Figure 4 shows an elevational view of a modified unit similar to that shown in Figure 3 and embodying constructional means, according to the invention, to provide a variable water series resistance to render the adjustment and operation of the unit independent of the type or characteristics of the water being treated. The parts differing from Figure 3 have been shown more clearly by the broken-away portion of the drawing.

For this purpose, the upper end of the anode cup 50 is closed by a pair of closely-fitting cover members 65 and 66 of insulating material such as a suitable molded plastic secured to said cup by crimping and/or spinning over the edge of the cup, as shown, or in any other suitable manner to produce a water-tight joint. Member 65 is of disk shape and member 66 represents an inverted cup suitably dovetailing with the member 65 and clamped into liquid-tight engagement therewith and with the anode cup by the provision of suitable gaskets such as shown at 65' and readily understood from the drawing. Member 65 has a central perforated extension 67 to cause a steady stream of water to flow through the inner space thereof and out through a suitable lateral outlet passage or opening 68. In order to prevent clogging by dirt or other foreign matter, and to prevent direct electrical path to the outer container, the extending member 65 is covered with a metal screen 70 held in any suitable manner such as by crimping and having a portion extending and being connected to the anode 50 and also covering the outlet opening 68. In the example shown, the connection to the anode is effected by clamping the end of the screen member between the member 66 and the inturned or spun edge of the anode cup 50.

There is, furthermore, shown in Figure 4 a rivet 71 or other conducting element passing from the inner to the outer face of the insulating disk 65 in a water-tight manner and being in contacting engagement with the positive terminal of the dry cell 60. There is established in this manner a water resistance path from the positive pole of the dry cell by way of the rivet 71 through the water column in the extension 67 to the screen 70 and the anode 50, on the one hand, and by way of the parallel path through the outlet opening 68, on the other hand. The design of these water resistance paths is such that the combined voltage drop therethrough from the dry cell 60 to the screen 70 will result in the desired treating or operating voltage between the main electrodes 45 and 50 for a given fixed battery voltage in a manner which will be evident from the above.

Referring to Figure 4A, there is shown a fractional view of Figure 4, illustrating a modification thereof to provide an adjustable water series resistance. For this purpose there is provided an exchangeable tubular member 73 made of glass, Bakelite or other insulating material having a desired inner diameter and inserted in the vertical bore or channel of the insulating member 67. All that is necessary, in this case, to obtain a different series resistance is to remove the top of the screen 70 and to drop a different tube 73 having a suitable inner diameter to result in a desired combined series resistance and corresponding operating voltage between the main operating electrodes of the device. In this manner, the device may be adjusted to suit different operating conditions and characteristics of the water being treated or other existing requirements. An alternative or additional way to adjust and vary the series resistance consists in adjusting the projecting length of a pin or wire 74 integral with or otherwise secured to a screw-threaded rod or shaft 75, replacing the rivet 71 of Figure 4 and adjustably mounted in the insulating disk 65 and liquid-proofed by a nut 76 and washer 76'.

Referring to Figure 5, there is shown another modified construction of a simple and compact unit of the type shown in Figure 3. In this embodiment, the outlet 77 is at an angle rather than concentric with the main casing or cathode as shown in the previous modification. This construction has the advantage of enabling the exchange of the dry cell without completely disassembling the device, as will be further understood from the following.

For this purpose, the lower open end of the anode cup 50 is formed with an out-turned edge or flange 78 surrounded by a resilient rubber washer 79 or trough- or channel-shaped cross-section and clamped against an inner shoulder provided by the lower enlarged portion of the cathode or casing 45 by the aid of a clamping ring 80 engaging and screwed into the internally threaded enlarged end part of the casing 45. A further washer 81 may be inserted to insure a water-tight joint. The dry cell 60 is then inserted into the anode cup 50 and the lower end of the cathode 45 closed by a screw-on type metal cover or disk 82. A compression spring 83 interposed between the latter and the bottom of the battery 60 results in an electric contact connecting the negative pole to the casing or cathode 45. In order to prevent accidental short-circuit, a rubber ring or the like 57' is shown in a circumferential groove of the anode cup 50 acting as an insulating spacer between the electrodes.

Figure 6 shows a modification of a device substantially like that shown in Figure 5 but mounted in an inverted position, that is, with the inlet and outlet being interchanged to enable the mounting of a microammeter 85 in the cover 62 for adjusting and supervising the operating or treating voltage. Microammeter 85 is suitably connected in series with the electric circuit, together with a variable resistance (not shown) for controlling the operating voltage in a manner shown by the diagram in Figure 1 and readily understood from the above.

Referring to Figure 7, there is shown a fractional view of a device of the type according to Figure 1, including a different structural embodiment of an adjustable water resistance in accordance with the invention. For this purpose, member 14 is shown mounted in inverted position and the inner electrode 13 extended in the opposite direction in the manner shown. An internally threaded insulating bushing 88 having a head 86 consisting of a suitable molded plastic and provided with a threaded metal insert 87 directly mounted therein is screwed in a bore or opening of the outer tube 10 in a liquid-tight manner such as by the provision of a suitable gasket, as shown, or the like. The inner end of the bushing 88 extends through an opening in the anode 13 and a threaded metal rod or screw terminal centrally passing through it may be adjusted to varying distances from a central axial extension 91 of the anode-supporting member 14. With the inner member 13 forming a floating or bi-polar electrode, the bolt 17' and bushings 15 and 21 merely serve as an insulating and liquid tight mounting means for the electrode 13. Furthermore, the extension 13' of the electrode 13 enclosing the auxiliary electrode or projection 91 forms an electrostatic screen, to prevent a direct return or current flow between the electrodes 10 and 90 and to provide an electric series circuit containing the source 42 and the substantially electrically independent liquid resistances formed by the main liquid gap between the electrodes 10 and 13 and the auxiliary liquid gap formed by the auxiliary electrodes 90 and 91, respectively.

In this manner, by the proper adjustment of the screw terminal 90, a desired water resistance will be obtained in series with the battery or source 42 and the main operating electrodes 10 and 13, in a manner readily understood from the above. Once the voltage between the electrodes 10 and 13 has been adjusted to a desired value with the aid of suitable electrical instruments, the screw terminal 90 may be permanently fixed or locked by a coating of varnish or in any other suitable manner. No further adjustment or control will then be needed to insure a proper and constant operating voltage provided the same primary battery or voltage source 42 is employed as is used in the initial adjustment of the device.

As will be understood, the screw terminal 90 need not project beyond the bushing 88 as shown, in which case the water will penetrate into the open bore of the bushing, whereby to substantially increase the adjusting range of the series resistance and making it possible to design same substantially independently of the remaining parts.

While the device according to the invention has been described with specific reference to the electric treatment of water, it will be understood that the same may be employed with equal advantage in connection with other liquids or fluids to be conditioned or treated in the same or a similar manner. Thus, in general, in the case of mixtures, solutions, suspensions, etc., the electric treatment in the manner described is likely to result in similar effects such as in preventing precipitation in an undesirable form such as scale or in affecting or preventing other undesirable chemical actions after passing the treating apparatus. It is understood, therefore, that the device as described hereinabove may be used with equal advantage in all such analogous cases of liquid or fluid treatment independently of the special use or final results to be obtained. Thus, even in the treatment of water, the apparatus in one case may be specially intended for preventing scale in connection with boilers or other heating devices, while in other cases the object may be more or less limited to the improvement in the use of soaps such as in laundries and various other applications.

While there have been shown and described a few desirable embodiments of the invention, it is understood that this disclosure is for the purpose of illustration and that various changes in shape, proportion and arrangement of parts, as well as in the substitution of equivalent elements for those herein shown and described, may be made without departing from the spirit and scope of the invention, as defined in the appended claims. The specification and drawings are accordingly to be regarded in an illustrative rather than a restrictive sense.

I claim:

1. A device for electrically treating a liquid stream comprising a pair of spaced main electrodes forming a main liquid gap, a conduit including said gap and extending from opposite ends thereof for restricting the entire liquid stream to be treated to said gap in exposed contact with said electrodes, auxiliary electrode means within said conduit being spaced from said main liquid gap and substantially electrically independent therefrom, the liquid gap formed by said auxiliary electrode means having a cross-section and length to provide an electric resistance being a substantial multiple of the electric resistance of said main liquid gap, and series circuit means for connecting said main electrodes and said auxiliary electrode means to a voltage source.

2. A device for electrically treating a liquid stream comprising a pair of spaced main electrodes forming a main liquid gap, a conduit including said gap and extending from opposite ends thereof for restricting the entire liquid stream to be treated to said gap in exposed contact with said electrodes, a pair of auxiliary electrodes within said conduit being spaced from said main liquid gap and substantially electrically independent therefrom, the liquid gap formed by said auxiliary electrodes having a cross-section and length to provide an electric resistance being a substantial multiple of the electric resistance of said main liquid gap, and series circuit means for connecting said main electrodes and said auxiliary electrodes to a voltage source.

3. A device for electrically treating a liquid stream comprising a pair of spaced inner and outer main electrodes, the latter substantially enclosing the former to form a main liquid gap, a conduit including and extending from opposite ends of said outer electrode for restricting the entire liquid stream to be treated to said gap in exposed contact with said electrodes, an extension of said inner electrode forming a first auxiliary electrode, a further auxiliary electrode insulatingly mounted in and passing through said conduit, said auxiliary electrodes forming an auxiliary liquid gap spaced and substantially electrically independent from said main liquid gap, said auxiliary liquid gap having a cross-section and length to provide an electric resistance being a substantial multiple of the electric resistance of said main liquid gap, and means for connecting a voltage source between said further auxiliary electrode and said outer electrode.

4. A device as claimed in claim 3 including electrostatic screening means of electrically conducting material connected to said inner electrode and enclosing said first auxiliary electrode.

5. A device for electrically treating a liquid stream comprising a pair of concentric cylindrical inner and outer main electrodes, the latter substantially enclosing the former to provide a main liquid gap, a conduit including and extending from the opposite ends of said outer electrode for restricting the entire liquid stream to be treated to said gap in exposed contact with said electrodes, a first auxiliary electrode connected to and axially extending from said inner electrode, a second auxiliary electrode insulatingly mounted and passing through said conduit, said auxiliary electrodes forming an auxiliary liquid gap spaced and substantially independent from said main liquid gap, said auxiliary liquid gap having a cross-section and length to provide an electric resistance being a substantial multiple of the electric resistance of said main liquid gap, and means for connecting a voltage source between said outer electrode and said second auxiliary electrode.

6. A device as claimed in claim 5 including a perforated conducting screen connected to said inner electrode and enclosing said first auxiliary electrode, to substantially prevent current flow between said second auxiliary electrode and said outer electrode.

WILLIAM DUBILIER.

REFERENCES CITED

The following references are of record in the file of this patent:

UNITED STATES PATENTS

| Number | Name | Date |
|---|---|---|
| 525,304 | Woods | Aug. 28, 1894 |
| 661,340 | Grever | Nov. 6, 1900 |
| 671,946 | Holland | Apr. 9, 1901 |
| 820,113 | Hinkson | May 8, 1906 |
| 935,457 | Bridge | Sept. 28, 1909 |
| 1,065,361 | Hartman | June 24, 1913 |
| 1,403,102 | Perkins | Jan. 10, 1922 |
| 1,930,830 | Twombly | Oct. 17, 1933 |
| 2,121,875 | Kruse | June 28, 1938 |
| 2,207,583 | Freeborn | July 9, 1940 |
| 2,299,964 | Crouch | Oct. 27, 1942 |